Dec. 5, 1933.  J. H. TAYLOR  1,937,604
METHOD OF MAKING MANHOLE STRUCTURES
Filed May 25, 1931
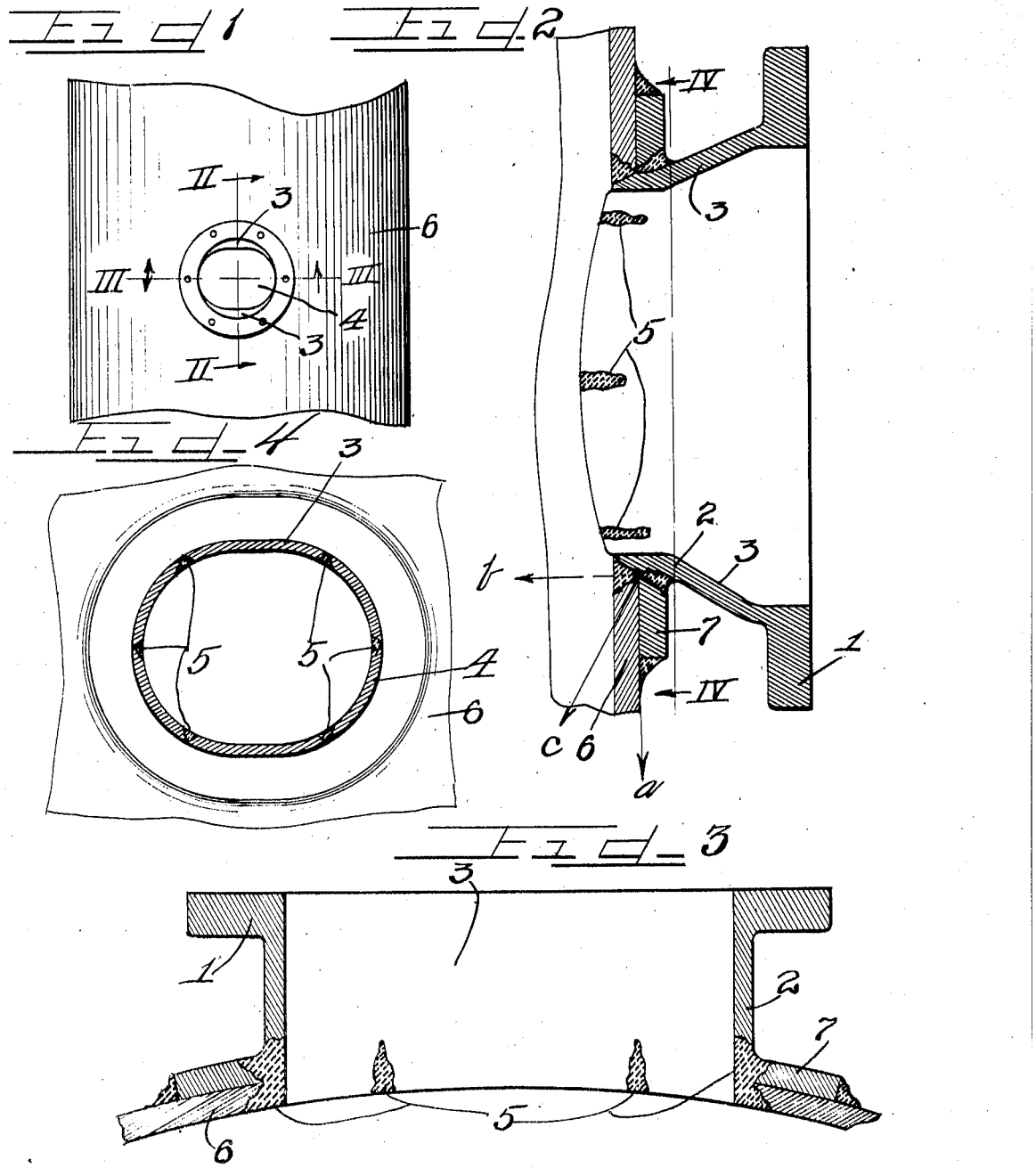
Inventor
James Hall Taylor.

Patented Dec. 5, 1933

1,937,604

UNITED STATES PATENT OFFICE 1,937,604

METHOD OF MAKING MANHOLE STRUCTURES

James Hall Taylor, Oak Park, Ill.

Application May 25, 1931. Serial No. 539,731

5 Claims. (Cl. 29—148.2)

This invention relates to a manhole structure and the method of making the same.

In high vertical tanks or towers that are used in some industries, it is necessary to have a vertical series of manholes which are spaced a suitable distance apart. Such a series of manholes usually weakens the tanks and as the flanged heads that form the manholes are usually of thick metal welded to the thick metal wall of the tanks, high tension stresses are set during the cooling period after a welding operation, and unless these stresses are relieved in some way, the shell or joint may fracture.

It is an object of this invention to overcome these objections in making the welded end of the flanged neck elliptical or oblong to leave more metal between adjacent manholes and avoid the weakening of the tank that occurs when cylindrical ended flanged necks are used and to taper or incline the sides of the neck to provide a certain flexibility that allows the same to move outwardly with the shell of the tank as it cools and contracts to relieve the tension stresses and avoid cracking the shell or weld. To facilitate this necessary outward movement of the neck suitable grooves or notches may be provided in the welding circle.

This invention comprises the novel method and structure hereinafter described and more particularly pointed out and defined in the appended claims.

In the accompanying drawing which illustrates the preferred form of construction and in which similar reference numerals refer to similar features in the different views:

Figure 1 is a side elevational view of a tank equipped with a manhole structure involving this invention;

Figure 2 is an enlarged sectional view taken upon the line II—II of Fig. 1;

Figure 3 is an enlarged sectional view taken upon the line III—III of Fig. 1; and Figure 4 is an enlarged sectional view taken upon the line IV—IV of Fig. 2.

According to this invention, I form a manhole structure with an outer circular portion having a flange 1 and a neck portion 2 with diametrically opposite tapering sides 3 that form a substantially oblong terminal 4 with substantially inclined flat sides. These tapering flat sides have a two fold purpose. In the first place they increase the amount of metal between adjacent manholes in the tank over circular apertures. In the second place, these inclined flattened portions will give more readily than more arcuate portions with the result that as the tank shell cools after a welding operation, such flat sides will move outwardly and follow the wall of the opening as it contracts and relieve the tension stresses. I may provide grooves or gaps 5 in the oblong terminal of the neck, a gap is preferably placed at each end of a flat portion 3, to increase the flexibility of the flat portions to move outwardly with the wall of the aperture during cooling and contraction.

In applying the described manhole structure to a tower or tank, an oblong aperture is made in the wall 6 thereof to receive the neck of the manhole structure. The neck is then inserted in the aperture and an oblong ring 7 that surrounds the neck is welded to the wall 6 and neck 2 by an electric arc or the like.

After the welding operation, the shell 6 of the vertical tank which has expanded during such operation will contract. The direction of the forces due to such contractions are indicated by the arrows $a$ and $b$, one force being shown as directed inwardly of the tank and the other being shown as directed in the plane of the tank. The neck of the manhole structure must follow this contraction and it will present a force in the direction of the arrow C. The design of the neck is such that it will yield accordingly.

Welding metal is fused in the gaps or grooves 5 after a suitable interval has elapsed.

It will be appreciated that the tapering and substantially flat sides of the necks of the manhole structure will have sufficient yield, especially when grooves or gaps are made therein to follow the wall of the shell in its contraction so as to relieve the tension stresses and to avoid a fracture of the shell or welded joint.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of welding a flanged tubular metal member to a hollow metal body which consists in tapering diametrically opposite sides of said member from points adjacent said flange to the inner end thereof to produce a yield therein, and form an oblong terminal, forming an oblong aperture in said hollow metal body, and welding said oblong terminal in said aperture, said tapering sides yielding with the contraction of said body during cooling.

2. The method of welding a flanged tubular metal member in a hollow metal body which consists in tapering diametrically opposite sides of said member from points adjacent said flange to the inner end thereof and partially flattening the same for yielding purposes and for forming an oblong terminal, forming an oblong aperture in said metal body, inserting said oblong terminal in said opening and welding the same therein, said partially flattened sides yielding with the contraction of said body during the cooling period.

3. The method of welding a tubular metal member in a hollow metal body which consists in tapering diametrically opposite sides of said member and partially flattening the same to form an oblong terminal, forming notches in said oblong terminal, making an oblong aperture in said hollow body, inserting said oblong terminal in said aperture and welding the same therein, the parts between the notches in said oblong terminal yielding with the contraction of said hollow body during cooling.

4. The method of welding a tubular metal member in an aperture in a hollow body which consists in forming a plurality of spaced notches in that portion of said tubular member adapted to extend into the aperture of said hollow body, inserting said portion of said tubular member into said aperture, welding said tubular member to said hollow body and filling said notches with welding metal, the portions between said notches yielding during the contraction of said hollow body during cooling.

5. The method of welding a tubular metal member in an aperture of a hollow body which consists in forming a plurality of spaced V-shaped notches in that portion of said tubular member adapted to extend into said aperture, inserting said portion into said aperture, welding the same thereto and filling said notches with welding metal.

JAMES HALL TAYLOR.